United States Patent [19]
Ekdahl et al.

[11] 3,994,207
[45] Nov. 30, 1976

[54] BRAKE ACTUATOR

[75] Inventors: Kurt Egon Ekdahl, Barseback; Nils Borje Lennart Sander, Malmo, both of Sweden

[73] Assignee: Svenska Aktiebolaget Bromsregulator, Malmo, Sweden

[22] Filed: Sept. 15, 1975

[21] Appl. No.: 613,191

[30] Foreign Application Priority Data
Sept. 23, 1974 Sweden.............................. 7411912

[52] U.S. Cl.......................................... 92/29; 92/63; 92/130 A
[51] Int. Cl.² ........................ F01B 9/00; F01B 7/00
[58] Field of Search...................... 92/29, 63, 130 A

[56] References Cited
UNITED STATES PATENTS

| | | |
|---|---|---|
| 3,100,032 | 8/1963 | Larsson............................ 188/196 |
| 3,107,583 | 10/1963 | Woodward........................... 92/63 |
| 3,498,188 | 3/1970 | Rodrigues............................ 92/29 |
| 3,704,653 | 12/1972 | Higgins............................... 92/29 |
| 3,782,251 | 1/1974 | LeMarchand........................ 92/63 |

FOREIGN PATENTS OR APPLICATIONS
1,192,338   5/1970   United Kingdom.............. 92/130 R Primary Examiner—Paul E. Maslousky
Attorney, Agent, or Firm—Laurence R. Brown

[57] ABSTRACT

A spring brake actuator has a fluid actuated piston coupled to the brake applying piston rod through a manually disconnectable conveying mechanism which enables the piston rod to return alone and which thereafter returns automatically to a position for conveying the piston rod in response to the piston movement.

2 Claims, 3 Drawing Figures

BRAKE ACTUATOR

This invention relates to a brake actuator, preferably for a railway vehicle.

It is common practice in the braking field to design a brake actuator with a piston movable in a housing and acted on by a working fluid pressure. The force from the piston is transmitted to further parts of a vehicle brake rigging via a piston rod attached to the piston. A railway vehicle brake rigging usually contains a slack adjuster of some kind, and such a device may be incorporated in the brake actuator.

A disadvantage with such an actuator is that no brake force may be obtained in the absence of working fluid pressure. Therefore, it has not been unusual to attach a spring brake actuator to the service brake actuator. The spring therein will be held inactive and compressed by a fluid pressure, but will expand at the absence thereof, so that the push rod of the spring brake actuator will act on the piston of the service brake actuator and give a brake force.

With such a combined brake actuator the brakes will be applied by the spring at the absence of the spring brake fluid pressure, and therefore, in order to allow any removal of the vehicle, there may be a conveying mechanism between the piston and the push rod of the spring brake actuator. The mechanism is normally arranged to convey the push rod at the piston movement forward under the influence of the spring. The mechanism is, however, manually disconnectable for enabling the push rod to return alone (for example under the influence of the return spring for the service brake piston) and is preferably arranged to return automatically to a position for again conveying the push rod after the piston return, so that the spring force can be transmitted via the push rod. A typical example of such a conveying mechanism is shown in our U.S. application Ser. No. 514,929 filed Oct. 15, 1974 by Nils G. Dahlkvist, Lars B. Axelsson and Nils B. L. Sander for Device for Discontinuing and Automatically Restoring the Operational Function of a Spring Brake Actuator.

More recently it has been proposed to utilize a spring brake actuator for service braking, in which case a lowering of the working fluid pressure will have the effect that the brakes will be applied under the influence of the spring.

The object of the invention is to accomplish a spring brake actuator of the last mentioned kind having the same advantages as the earlier known conventional brake actuators. This is attained in that the brake actuator according to the invention is characterised by the combination of a piston movable in a housing, a compression spring urging the piston in a brake applying direction forward against the action of a working fluid pressure on the opposite side of the piston, a piston rod at the side of the piston opposite the spring, a slack adjuster connected to the piston rod and acting on further parts of the brake rigging, and a conveying mechanism between the piston and the piston rod, which mechanism at the piston movement forward is arranged to convey the piston rod but is manually disconnectable for enabling the piston rod to return alone and is arranged to return automatically to a position for again conveying the piston rod after the piston return.

They will be described in further detail below, reference being made to the accompanying drawing, showing in FIG. 1 a brake actuator according to the invention, partly in section.

Figure 1:
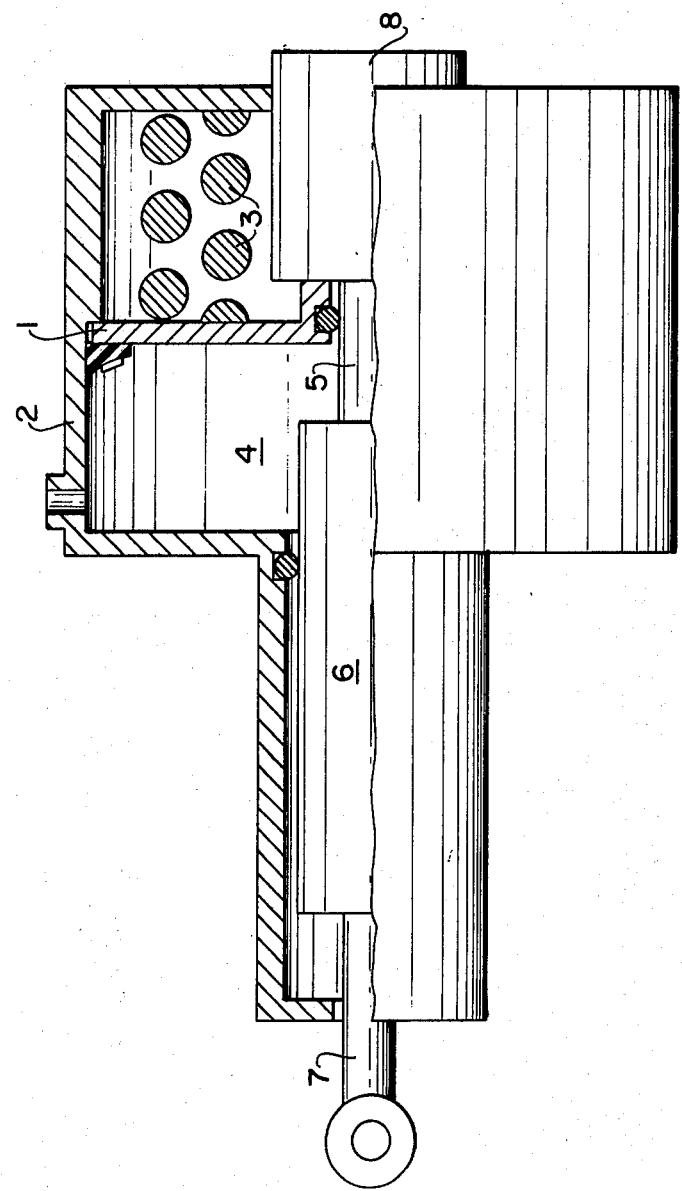

A piston 1 is axially movable in a cylindrical housing 2 under the influence of on the one side at least one spring 3 and on the other hand a working fluid pressure in a chamber 4. A piston rod 5 is connected to a schematically indicated slack adjuster 6 of any suitable type known per se. An outgoing push rod 7 is to be attached to further parts (not shown) of a brake rigging on a railway vehicle, whereas the actuator itself is to be attached to a suitable part (not shown) of the vehicle underframe.

A conveying mechanism 8 known per se is only schematically outlined but has the following function: Normally the mechanism is holding the piston 1 and the piston rod 5 together, so that the force from the spring 3 is transmitted to the slack adjuster 6 via the piston 1 and the piston rod 5 at decreasing working fluid pressure in the chamber 4. When no working fluid pressure is available (due to any fault in the system or after a long parking) and it is desirable to relieve the brake rigging from the force of the spring 3, the conveying mechanism 8 may be manually disconnected by means of an external tool or otherwise, so that the piston 1 will be free to move forward under the influence of the spring 3 and the piston rod 5 (together with the slack adjuster and the push rod 7) will be free to move in the opposite direction under the influence of the brake reaction force and possibly of a return spring somewhere in the brake rigging. When the working fluid pressure returns to the chamber 4 the piston 1 will return to its shown position, and the conveying mechanism 8 will automatically return to its position for again conveying the piston rod in the normal way.

The details of slack adjuster 6 and conveying mechanism 8 shown in block diagram form herein are known in the art and the conveying mechanism may be for example, the mechanisms of U.S. Ser. No. 542,612 filed Jan. 20, 1975 by K. E. Ekdahl et al., and the above mentioned Swedish Patent, U.S. Ser. No. 514,929 filed Oct. 15, 1974 by Nils Dahlkvist et al., both of which are incorporated herein by reference.

Figure 2:
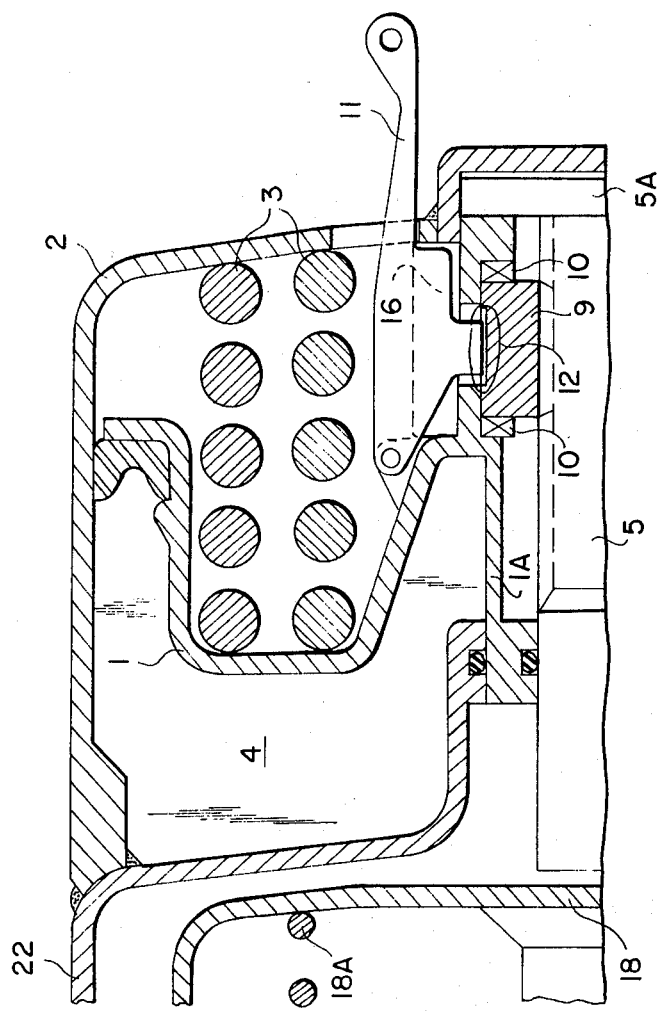
FIG. 2 is a partial, section view of a spring brake release and reset mechanism, showing a particular conveying mechanism coupled between the brake cylinder and the brake push rod.

A summarization of the subject matter of those respective applications which relates to the present invention follows:

As appears from FIG. 2 a spring brake cylinder 2 is attached to a service brake cylinder 22. A spring brake piston 1 is acted upon by on one side a spring 3 and on the other side fluid pressure in a fluid chamber 4. The central part of this piston can be called a piston rod 1A and is guided for axial movements by an opening in the service brake cylinder end wall and a guiding tube 16 attached to the spring brake cylinder 2 and having a closed end constituting a stop for the return movement (to the right) of a push rod 5. This push rod is provided with a flange 5A as shown and is arranged to act on a service brake piston 18, which as usual is connected to suitable parts of the brake rigging and is acted upon by a return spring 18A.

A nut 9 is rotatably journalled in the piston 1 by means of anti-friction bearings 10 and has a non-selflocking engagement with threads on the push rod 5. The nut is provided with ratchet teeth on its outer periphery. A control lever 11 is pivotally attached to the piston 1 and extends out from the cylinder 2. The lever is urged into engagement with the ratchet teeth on the nut 9 as shown in FIG. 2 by means of a spring (not shown), thus constituting a spring-actuated clutch 12.

The thread direction on the push rod 5 and the locking direction of these ratchet teeth in cooperation with the control lever 11 are such that on normal application at falling fluid pressure and under the influence of the spring 3 the nut 9 will be locked on the push rod 5, which means that the force from the piston will be transmitted to the push rod 5 via the nut 9 (and then further to the brake rigging via the service brake piston 18). On the return stroke (under the influence of fluid pressure in the fluid chamber 4) the force from the piston will be transmitted to the push rod 5 over its flange 5A.

The push rod 5 will move to its extreme right position under the influence of the return spring 18A for the service brake piston 18, whereas the spring brake piston 1 will move to its extreme left position under the influence of the spring 3 (and the control lever 11 will be spring-biassed to the shown position engaging the ratchet teeth on the nut 9).

It is now evident that with lever 11 disengaged so that nut 9 can freely rotate on push rod 5 the spring 3 has no influence on the service brake piston and thus not on the vehicle brake rigging and that it will be possible to move the vehicle in spite of the fact that no fluid pressure is available, i.e. that the spring brake actuator is applied.

When the fluid pressure returns to the fluid chamber 4 the piston 1 will move to the right, and during this movement the nut 9 will rotate on the push rod 5 and the control lever 11 will only slide on the ratchet teeth due to their opposite locking direction. When the position according to FIG. 2 has been reassumed the spring brake actuator is ready for normal operation.

Figure 3:
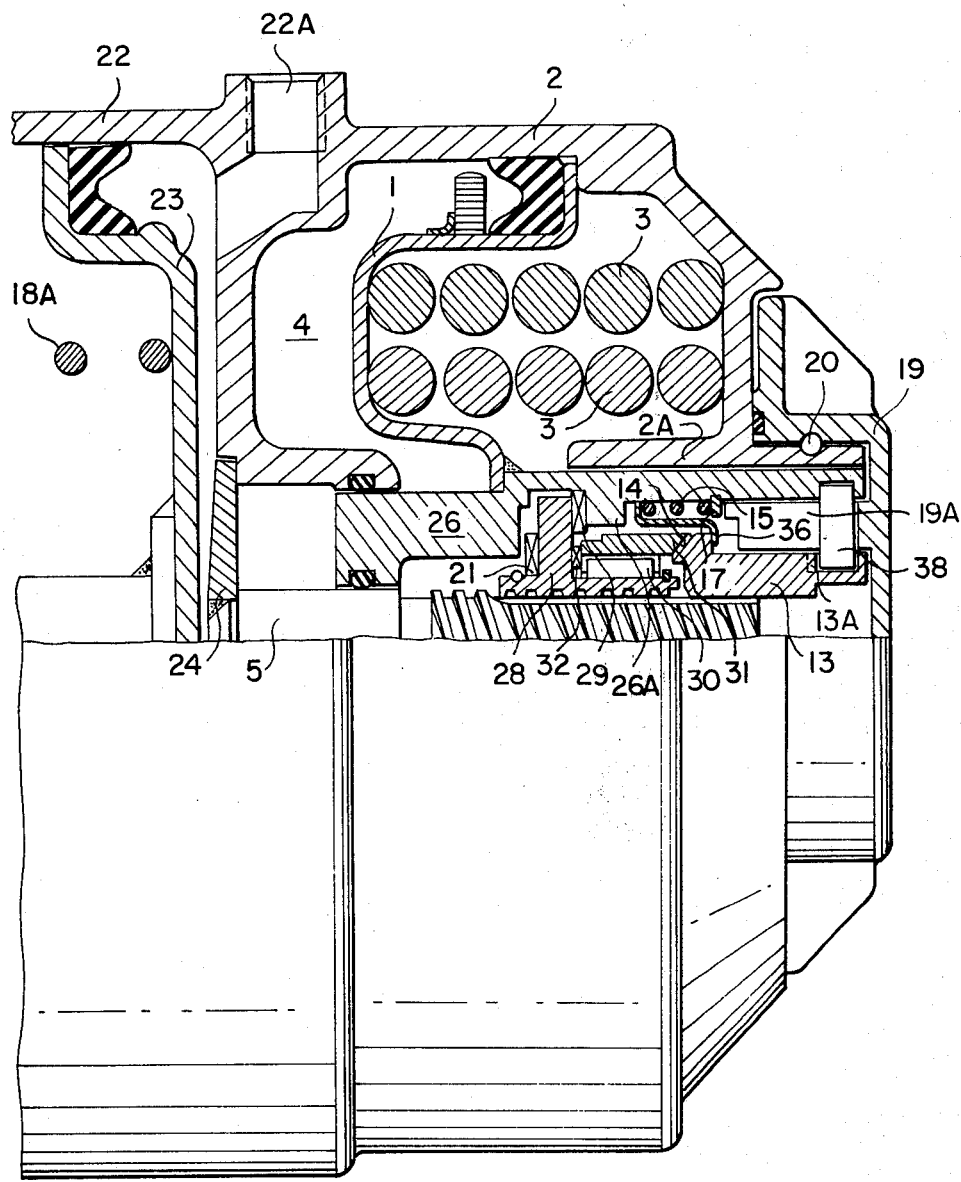
FIG. 3 is a partial, section view of a spring brake release and reset mechanism where the force of the spring is transmitted to a slack adjuster mechanism.

Referring to FIG. 3 a spring brake cylinder 2 is attached to a service brake cylinder 22 provided with an inlet 22A for service brake fluid. A spring brake piston 1 is acted upon by on one side a spring 3 and on the other side fluid pressure in a fluid chamber 4, whose fluid inlet is not shown. The central part of this piston 1 can be called a piston rod 26 and is guided for axial movements by an opening in the service brake cylinder end wall and a tubular extension 2A of the spring brake cylinder end wall. A screw-threaded push rod 5 is arranged in the tubular piston rod 26, and a nut 28 is in non-self-locking engagement with the push rod 5.

At a fall of the fluid pressure in the chamber 4 the force from the spring 3 will be transmitted to the nut 28 via the piston 1, the piston rod 26, a force-transmitting piston rod flange 26A and a first anti-friction bearing 29. The said force will also be transmitted to the push rod 5 (as well as to further parts of the vehicle brake rigging) provided that the nut is held against rotation on the push rod 5. This is the case under all normal circumstances, and the means for accomplishing this will be described below.

A one-way clutch 30, which in the preferred embodiment is in the form of a free-wheel mechanism but also may be a locking spring or the like, is arranged between the nut 28 and a clutch ring 31 as shown. The clutch ring 31 is rotationally journalled relative to the nut 28 by means of a second anti-friction bearing 32 and is provided with teeth at its end facing from the nut 28. These teeth are intended for cooperation with corresponding teeth on a clutch sleeve 13, the teeth together constituting a dog clutch 14. The clutch sleeve 13 is axially movable but rotationally immovable by being provided with an inwardly extending projection in engagement with an axial groove in the push rod 5. The dog clutch 14 is held engaged by means of a helical compression spring 15 arranged between a spring sleeve 36 and a locking ring 17 in the piston rod 26.

The clutch sleeve 13 is provided with an oblique control groove 13A for a control pin 38, which is also extending into a circumferential groove in the piston rod 26 with at least the same length as the control groove. An exterior control member 19 is arranged at the end of the cylinder 2 and may be turned relative to the same in that there is a circumferential groove in the cylinder extension 2A engaged by a guide pin 20 in the control member 19. This member 19 is provided with a tubular sleeve 19A with an axial or longitudinal slot for the control pin 38 as shown. It is evident that by this arrangement it is possible to disengage the dog clutch 14 from the outside. At a turning of the control member 19 the control pin 38 will move in the circumferential groove in the piston rod 26 and the oblique groove 13A in the clutch sleeve 13, so that the latter will be moved to the right in the Figure relative to the piston rod 26 and thus relative to the control ring 31.

At normal operation the nut 28 is thus prevented from rotating by the rotationally immovable clutch sleeve 13 via the one-way clutch 30, the clutch ring 31 and the dog clutch 14, the locking direction of the one-way clutch 30 being such that it prevents rotation of the nut 28 when the actuator spring force is applied to it over the piston rod flange 26A, whereas during the return stroke under the influence of increasing fluid pressure in the fluid chamber 4, the piston 1 with associated parts will move to the right in the figure at the same time as the push rod 5 moves in the same direction under the influence of a return spring 18A for a service brake piston 23 until the shown position is reached again.

If after a pressure fall in the fluid chamber 4 and thus a normal application, when the whole mechanism has moved a certain distance to the left in the Figure, no fluid pressure is available for the bringing back of the same to its shown initial position, it is possible to disengage the dog clutch 14 against the action of the spring 15 by turning the control member 19 and thus by moving the clutch sleeve 13 to the right in the Figure in its axial groove in the push rod 5. The nut 28 will now be free to rotate on the push rod 5 with the result that the piston 1 will move to its extreme left position under the influence of the spring 3, and that under the influence of a return spring in the vehicle brake rigging, for example the return spring 18A, the push rod 5 will be moved to the right in the Figure until a stop plate 24 on the push rod 5 will prevent further movement, i.e. until the push rod has reached its shown initial position.

Under the influence of the spring 15 the dog clutch 14 will be re-engaged when the control member 19 is released. However, at the return of fluid pressure in the fluid chamber 4, for the compression of the spring 3 the nut 28 will be actuated by the piston 1 via a third anti-friction bearing 21, and will rotate to the right on the push rod 5 due to the one-way clutch 30, which is free in this direction. The mechanism will thus at the end assume the position shown and will automatically be ready for normal operation.

It is thus clear that the now described brake actuator has the same advantages as a conventional but more complex actuator combination comprising a normal service brake actuator (with a built-in slack adjuster) and a spring brake actuator with a conveying mechanism of the described type. By means of the new actuator it is namely possible to obtain service braking and parking braking under the supervision of a simplified control system and also brake release in the absence of working fluid pressure.

What is claimed is:

1. A brake actuator preferably for operating brakes of a railway vehicle characterised by the combination of a housing, a fluid operated piston movable in said housing with a fluid chamber on one side to receive fluid and thereby move said piston under the influence of a working fluid pressure in a brake release direction, a compression spring on the other side of the piston urging the piston in a brake applying direction forward against the action of said working fluid pressure on the opposite side of the piston, a piston rod extending from the side of the piston opposite the spring to thereby urge the brakes into braking position by force of said spring, an automatic slack adjuster for taking up excessive slack connected to the piston rod and having a movable member extending from said housing for movement of the brakes in response to movement of said piston rod, a conveying mechanism normally holdng the piston and the piston rod coupled together for common movement of said piston rod and piston to apply braking forces solely from the force of said spring in the brake applying direction wherein said conveying mechanism comprises a selectively engaged conveying mechanism coupled between the piston and the piston rod to move the piston and the piston rod together, means manually disengaging said conveying mechanism to permit the piston rod to move in the brake release direction independently of said piston, and means automatically re-engaging said conveying mechanism to move the piston and piston rod together when the disengaged piston moves to a brake release position by application of fluid at said working pressure to said fluid chamber.

2. The brake actuator defined in claim 1 provided for operation both as a service brake and a parking brake having a single pneumatic cylinder for operating as the service brake by lowering of said working pressure to partially release said piston for movement by compression of said spring, and to also operate as the parking brake when working pressure is removed entirely to permit the compression spring to urge said piston to the brake applied position.

* * * * *